US011368933B2

(12) United States Patent
Stille et al.

(10) Patent No.: US 11,368,933 B2
(45) Date of Patent: Jun. 21, 2022

(54) DEVICE REGISTRATION IN A COMMUNICATIONS NETWORK

(71) Applicant: Telefonaktiebolaget LM Ericsson (publ), Stockholm (SE)

(72) Inventors: Mats Stille, Bromma (SE); Ralf Keller, Würselen (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/957,083

(22) PCT Filed: Dec. 22, 2017

(86) PCT No.: PCT/SE2017/051335
§ 371 (c)(1),
(2) Date: Jun. 22, 2020

(87) PCT Pub. No.: WO2019/125260
PCT Pub. Date: Jun. 27, 2019

(65) Prior Publication Data
US 2020/0344711 A1 Oct. 29, 2020

(51) Int. Cl.
*H04W 60/06* (2009.01)
*H04W 76/38* (2018.01)
*H04L 65/1016* (2022.01)

(52) U.S. Cl.
CPC ........... *H04W 60/06* (2013.01); *H04W 76/38* (2018.02); *H04L 65/1016* (2013.01)

(58) Field of Classification Search
CPC ....... H04W 60/06; H04W 76/38; H04W 8/06; H04W 60/00; H04L 65/1016; H04L 65/1073; H04L 65/1069
See application file for complete search history.

(56) References Cited

U.S. PATENT DOCUMENTS

| 8,311,521 | B1* | 11/2012 | Paczkowski | H04W 8/18 455/414.1 |
| 2003/0035529 | A1* | 2/2003 | Baker | H04M 7/006 379/211.02 |
| 2012/0033610 | A1* | 2/2012 | Ring | G06Q 20/14 370/328 |
| 2014/0211619 | A1 | 7/2014 | Suryavanshi et al. | |
| 2015/0327124 | A1* | 11/2015 | Keller | H04L 65/1016 370/331 |

(Continued)

FOREIGN PATENT DOCUMENTS

CN 102017576 A 4/2011

OTHER PUBLICATIONS

International Search Report and Written Opinion for International Application No. PCT/SE2017/051335, dated Jul. 25, 2018, 10 pages.

(Continued)

*Primary Examiner* — Mazda Sabouri
(74) *Attorney, Agent, or Firm* — NDWE LLP

(57) ABSTRACT

A method of managing registration of a User Equipment (UE) with an IP Multimedia Subsystem (IMS) via a Long-Term Evolution (LTE) network. The method comprises, following termination of a Voice over LTE (VoLTE) call, initiating a timer at the UE and, if no VoLTE call is initiated to or from the UE prior to expiry of the timer, then sending an IMS de-registration request from the UE to the IMS.

11 Claims, 5 Drawing Sheets

(56) References Cited

U.S. PATENT DOCUMENTS

| | | | |
|---|---|---|---|
| 2015/0358477 A1* | 12/2015 | Jeong | H04W 40/24 |
| | | | 370/259 |
| 2016/0353330 A1 | 12/2016 | Naik et al. | |
| 2017/0171832 A1 | 6/2017 | Joshi et al. | |
| 2018/0198830 A1* | 7/2018 | Wallis | H04L 65/1006 |
| 2018/0332084 A1* | 11/2018 | Choe | H04L 65/1096 |
| 2019/0342722 A1* | 11/2019 | Lee | H04W 4/029 |

OTHER PUBLICATIONS

"IMS Profile for Voice and SMS," Jun. 15, 2017, 57 pages, Official Document IR.92, Version 11.0, GSM Association.
"IMS Profile for Voice and SMS for UE category M1," Jun. 27, 2017, 13 pages, Official Document NG.108, Version 1.0, GSM Association.
Communication under Rule 71(3) EPC for EP Application No. 17825986.7, dated Jul. 5, 2021, 38 pages.
International Preliminary Report on Patentability for International Application No. PCT/SE2017/051335, dated Jul. 2, 2020, 8 pages.
Decision to grant a European patent pursuant to Article 97(1) EPC for EP Application No. 17825986.7, dated Sep. 30, 2021, 2 pages.
Office Action, CN App. No. 201780097894.2, dated Feb. 8, 2022, 8 pages of Original Document Only.

* cited by examiner

DEVICE REGISTRATION IN A COMMUNICATIONS NETWORK

CROSS-REFERENCE TO RELATED APPLICATIONS

This application is a National stage of International Application No. PCT/SE2017/051335, filed Dec. 22, 2017, which is hereby incorporated by reference.

TECHNICAL FIELD

The present invention relates to a method and apparatus for managing registration of a User Equipment (UE) with an IP Multimedia Subsystem (IMS) network of a communications network. More particularly, the invention relates to managing registration of UEs that are used to make Voice over Long-Term Evolution (VoLTE) calls.

BACKGROUND

The Internet Protocol (IP) Multimedia Subsystem (IMS) is a well-known Third Generation Partnership Project (3GPP) standard allowing sessions to be set up between two or more parties for a broad variety of services such as voice over IP (VoIP) calls, video calls, interactive messaging sessions or third party specific applications.

One commonly implemented 3GPP standard is referred to as Long Term Evolution (LTE), which was developed to support IP services over exclusively packet-switched core networks. LTE systems comprise a so-called Evolved Packet Core (EPC) which provides an interface layer between a radio access network (RAN) and the IMS. IP voice calls made over LTE networks typically conform to a set of standards and procedures known as Voice over Long Term Evolution (VoLTE). FIG. 1 illustrates schematically how the IMS fits into the network architecture for an LTE network.

Internet-enabled devices are becoming increasingly commonplace: a key driver is the so-called "Internet of Things" (IoT), in which physical devices, not usually associated with computing, communication networks or the internet (such as vehicles, home appliances, sensors and actuators) are provided with the functionality to send/receive data in order to integrate them into large-scale data networks. The expansion in the use of internet technology is presently occurring in a large number of areas, with applications in, for example, real-time monitoring of "smart homes" or transportation networks and in improving manufacturing process control or supply chain networks. However, in order to meet the challenges arising from large numbers of IoT devices, each able to connect to a network, new communication systems and methods are required. For example, the registration of large numbers of devices with a network may be resource intensive for service providers, e.g. because a large number of logical connections may be maintained by the service provider, or large amounts of context data stored.

Some IoT devices are configured to allow a user to make voice calls via a modem. For example, "smart" parking meters and vending machines may have functionality which allows a user to make a voice call to a service provider in order to seek assistance. The demands that voice calls from IoT devices place on communications networks may be very different to those of traditional consumer devices which make voice calls such as a smartphones. However, network standards have yet to be developed which take proper account of these differences. For example, applications for IoT devices to make VoLTE calls are typically required to conform to the GSM Association (GSMA) Official Document NG.108—IMS Profile for Voice and SMS for UE category M1, which is based on GSMA Permanent Reference Document (PRD) IR.92 which covers VoLTE applications for smartphones.

A popular choice of modem chipset for use with LTE networks is the 4G CAT-M1 class of low-bandwidth cellular modem chipsets, which offer lower power consumption, smaller form factor and lower price than other, traditional LTE modems offering higher bandwidths, which allows them to be included in a large number of devices.

SUMMARY

According to a first aspect of the invention there is provided a method of managing registration of a User Equipment, UE, with an IP Multimedia Subsystem, IMS, via a Long-Term Evolution, LTE, network. The method comprises, following termination of a Voice over LTE, VoLTE, call, initiating a timer at the UE and, if no VoLTE call is initiated to or from the UE prior to expiry of the timer, then sending an IMS de-registration request from the UE to the IMS.

The term UE is used here as it is defined by 3GPP, or evolutions thereof.

The de-registration request may be a Session Initiation Protocol, SIP, REGISTER request with timeout=0.

The method may comprise, in response to a VoLTE call being initiated from the UE after the predefined time, sending a registration request from the UE to the IMS. Typically, the UE sends the registration request before sending a SIP INVITE to initiate the VoLTE call.

A Packet Data Network, PDN, connection over which the de-registration request is sent may consequently be released. The method may further comprise, in response to a VoLTE call being initiated from the UE after the predefined time, re-establishing the PDN connection and sending a registration request from the UE to the IMS.

The method may comprise sending diagnostic or measurement data from the UE to a remote server using the PDN connection.

The method may comprise receiving, at the UE, via the PDN connection, a command for the UE to register with the IMS. Following registration of the UE with the IMS, the UE may receive a terminating VoLTE call.

The timer value may be is less than 1 hour or less than 10 minutes or less than 1 minute.

The VoLTE call may be initiated in response to user input received by a user interface.

According to a second aspect of the present invention there is provided an apparatus configured to operate as a User Equipment, UE, for a Long-Term Evolution, LTE, network. The apparatus comprising processor circuitry, a storage unit storing instructions executable by the processor circuitry, and a radio transceiver, the apparatus being operable to:
  following termination of a Voice over LTE, VoLTE, call, initiate a timer at the UE and, if no VoLTE call is initiated to or from the UE prior to expiry of the timer, then send an IMS de-registration request from the UE to the IMS to de-register the UE from the IMS.

The processor circuitry may comprise a 4G CAT-M1 cellular modem chipset.

The apparatus may be configured to allow the predefined time to be configured remotely.

The apparatus may comprise a controller for initiating a VoLTE call in response to user input. The controller may be, for example, a push button or a switch activated when the user lifts a handset.

DETAILED DESCRIPTION

Embodiments are described more fully below with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art.

A particular problem with the NG.108 profile used for CAT-M1/VoLTE devices, is that it refers to specification IR.92, which in turn stipulates that a device should make an IMS registration upon attaching to the LTE radio and packet core network in IMS Voice over Packet Switched (PS) capable coverage. Moreover, the device is required to remain registered as long as it resides under IMS Voice over PS-capable network coverage. However, the IR.92 specification is primarily directed towards devices which are used to make frequent VoLTE calls, such as smartphones. In cases where the devices make VoLTE calls only infrequently, the requirements imposed by the NG.108 profile may mean that the resources of the LTE network are used inefficiently. A further difference between IoT devices and other devices covered by the IR.92 specification is that IoT devices may typically wish to attach to the radio access network in order to send "IoT data", such as diagnostic or measurement data, without requiring access to the IMS.

Figure 1:
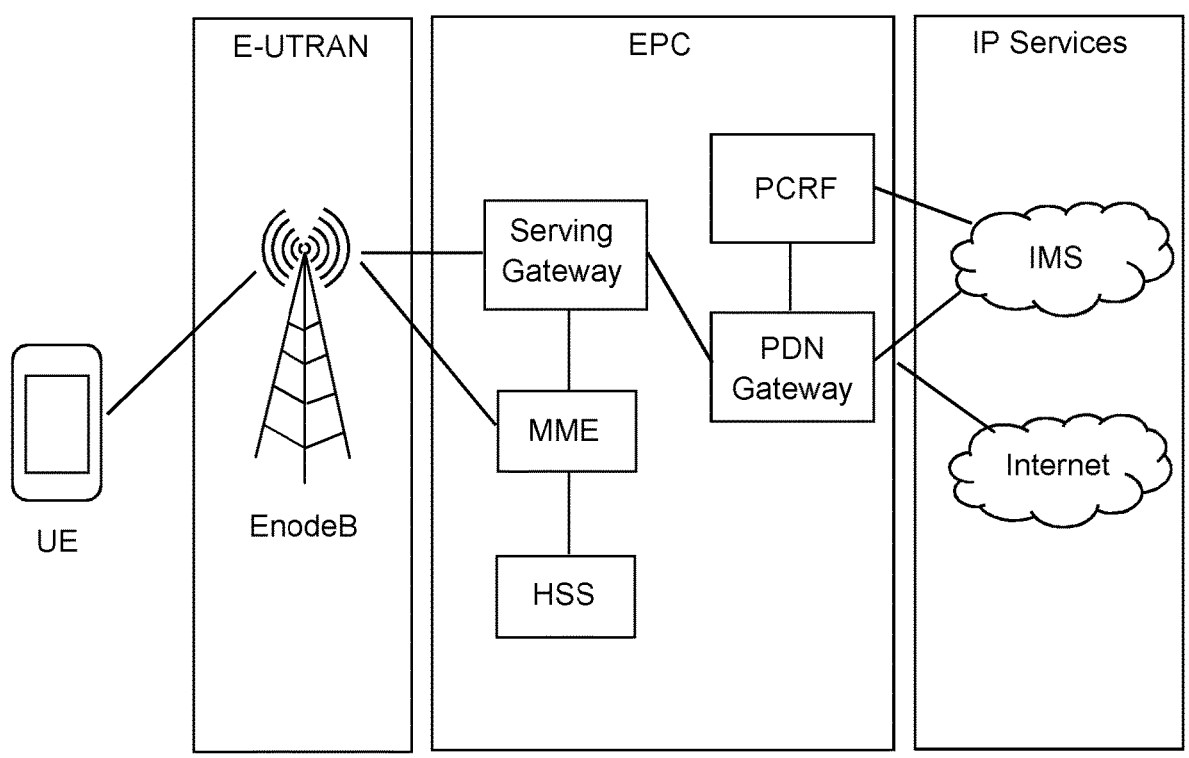
FIG. 1 illustrates schematically an IMS network integrated into an LTE network.
Figure 2:
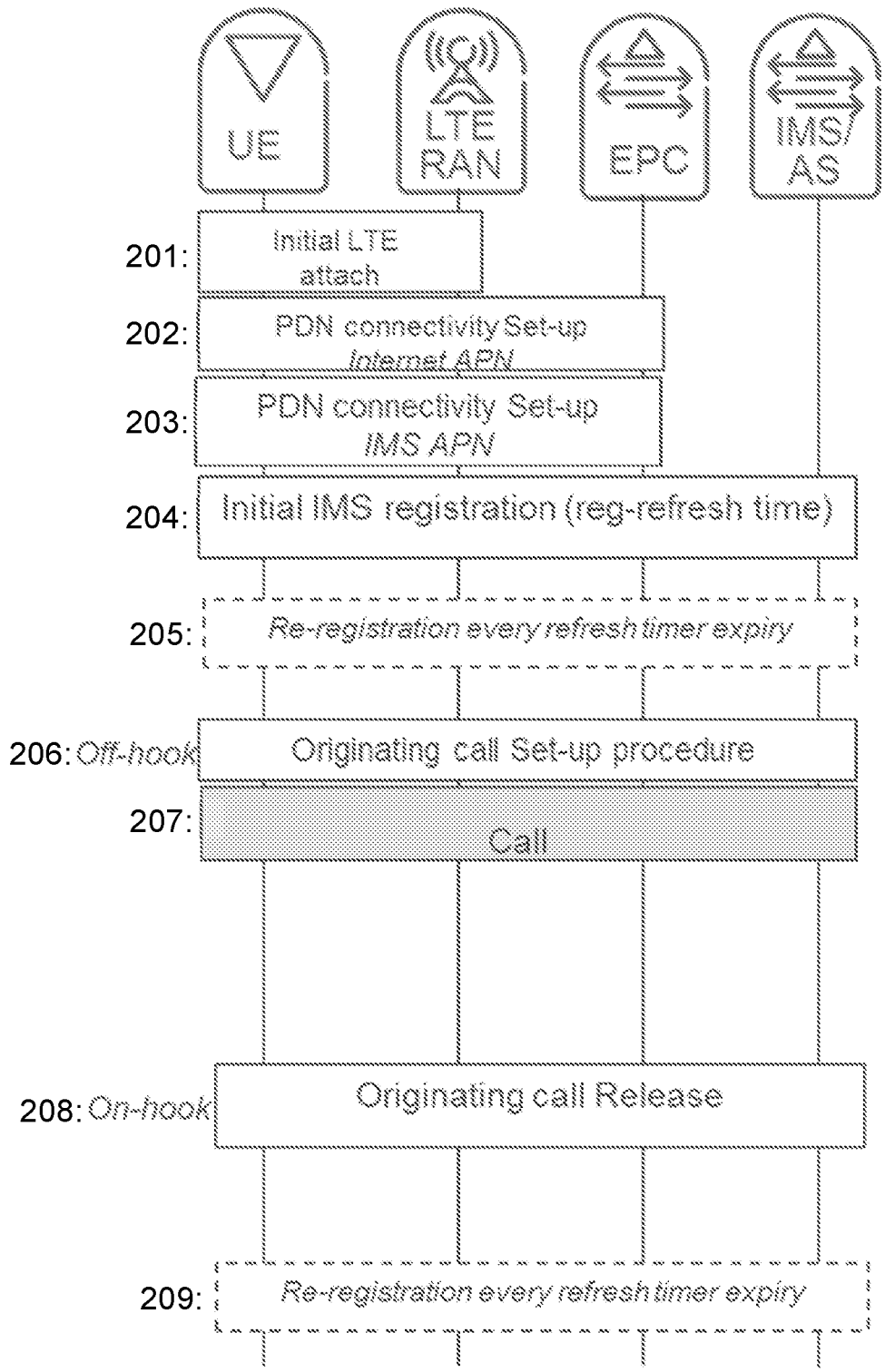
FIG. 2 shows signalling associated with a UE registration procedure.

FIG. 2 shows signalling associated interactions of a UE with an LTE network according to the NG.108 profile. The LTE network incorporates a Radio Access Network (RAN), a Packet Data Network (PDN) and an IMS. In this example, the UE is a device for making VoLTE calls. In step 201, the UE attaches to the RAN and connects to the Evolved Packet Core (EPC) of the LTE network using the packet data network (PDN). The UE makes PDN connections to gateways for Internet and IMS services, identified by Access Point Names (APNs), (steps 202 and 203). The UE is then registered with the IMS of the LTE network, e.g. via an Application Server (AS). Following the initial IMS registration (step 204), a refresh countdown timer is started. On expiry of the timer, a re-registration procedure is performed to keep the UE registered with the IMS (step 205). Following re-registration, the refresh timer is reset so that the re-registration process repeats in a loop. When a VoLTE call is initiated from the UE, the UE communicates with the IMS (e.g. via the AS) to set up the call (step 206), the call takes place (step 207), and then a release procedure is followed (step 208). After completion of the call, the refresh timer is re-started to ensure that that UE remains registered with the IMS (step 209).

In order to address the problems discussed above, the present invention involves de-registering the UE from the IMS if no new call is initiated or established within a predefined time period after the call is released. De-registering the UE from the IMS reduces the number of logical IMS registrations which must, on average, be supported by the LTE network. Waiting for a predefined time period to elapse before de-registering the UE reduces the likelihood that the UE will have to be re-registered with the IMS each time a VoLTE call is made, thereby reducing network overheads, such as bandwidth, associated with re-registration of the UEs. These overheads can be reduced further by registering the UE with the IMS only in response to a user (or the UE) initiating a VoLTE call, i.e. by avoiding automatic registration of the UE with the IMS when the UE attaches to the LTE network.

By way of example, a VoLTE capable UE may be integrated into a public parking meter. Users of a car park may make service calls from the meter which, during busy times, may be spaced apart by short intervals, e.g. every five minutes or so, but may become very infrequent at other times, such as during the night. In another example, the UE may be part of, or associated with, a machine or other piece of equipment so that a user may report a fault using a voice call. For example, the UE could be provided within a lift or elevator so that, in the event the lift breaks down, an occupant who is trapped in the lift can call for assistance.

Figure 3:
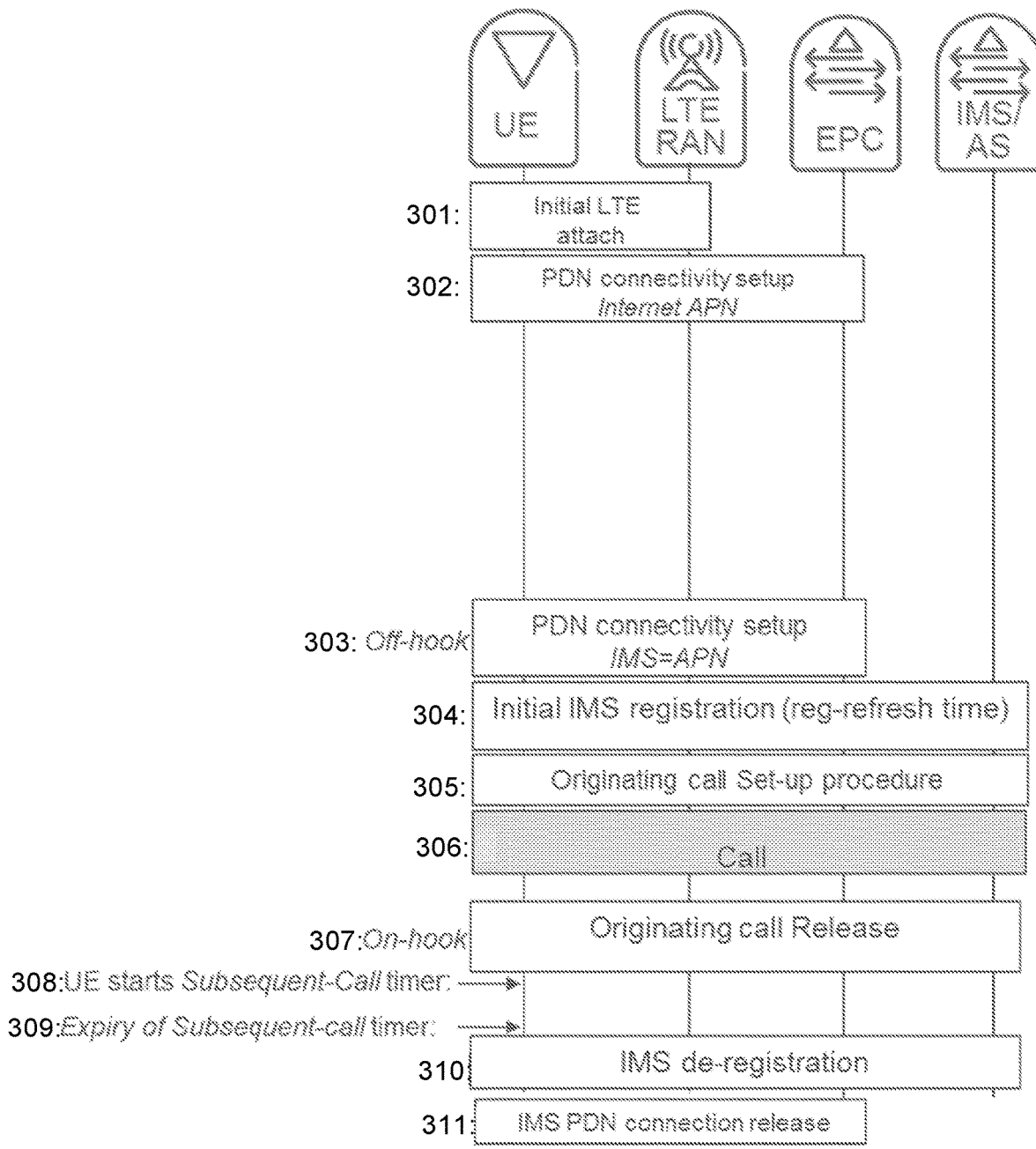
FIG. 3 shows signalling associated with a UE registration procedure according to an embodiment of the present invention.

FIG. 3 shows signalling associated with a UE IMS registration procedure according to an embodiment of the present invention. As described in relation to FIG. 2, the UE first attaches to the LTE RAN (step 301) and a PDN connection via the Internet APN gateway is established (step 302). However, no PDN connection via the IMS APN is established during the initial setup. Instead, the PDN connection to the IMS is set up only after the UE is "off-hook" i.e. a voice call is initiated by the UE (step 303). Registration of the UE with the IMS then occurs (step 304), followed by the setup of the call (step 305) and then the VoLTE call itself (step 306). When the call ends, i.e. when the UE is "on-hook" again, a call release procedure (step 307) is followed and a subsequent-call countdown timer is started at the UE (step 308). After a predefined time, the timer expires (step 309) and the UE sends a request to the LTE network to de-register from the IMS. After the UE is de-registered from the IMS (step 310), the PDN connection of the UE to the IMS may also be released (step 311). The UE may remain connected via the Internet APN in order to access IP services other than those provided by the IMS or to send commands to and/or receive commands from a remote server. For example, the UE may receive a web-based command (for example) to "connect to IMS", so that the UE may establish or re-establish an IMS connection in order that UE can subsequently receive an IMS-based VoLTE call. Such a command may, for example, be included in an HTTP 200 OK message in response to a long polling HTTP GET message sent from the UE to the remote server. Thus, the UE may connect to the IMS as a result of a command provided remotely over an internet connection, as well as (or instead of) as a result of a person physically interacting with the device, e.g. pressing a button to make a voice call.

Steps 303-311 are repeated when the UE is used to initiate (or receive) a further voice call. If a further voice call is initiated (or received) before the timer expires, the existing IMS registration and PDN connection to the IMS is used for the further voice call and the timer is then re-started when the further voice call ends. In other words, voice calls can be made one after another, without the need for IMS re-registration or IMS PDN re-connection of the UE, so long as the interval between each of the calls does not exceed the predefined time measured by the timer.

The duration or "time out" period of the subsequent-call timer may be set according to the frequency with which the UE is used or expected to be used. For example, the timer may be set to expire after less than 1 hour, less than 10 minutes or less than 1 minute. Where the UE is used very infrequently it may be preferable to set a short duration for the timer to avoid maintaining the registration of the UE with the IMS or PDN connection with the IMS for long periods unnecessarily. For more frequent use of the UE, longer timer durations may be preferable to avoid unnecessary registration/de-registration of the UE with the IMS in between voice calls. The UE may store or access data relating to previous voice calls made using the UE and use the data to help determine a suitable timer duration. For example, an adaptive algorithm may be used, in which the timer duration is increased during busy periods and decreased during quiet periods. The timer duration may also be remotely configurable, e.g. by the operator of the LTE network.

The subsequent-call timer may be controlled and/or maintained by the UE, e.g. a timer running on the UE itself.

Figure 4:
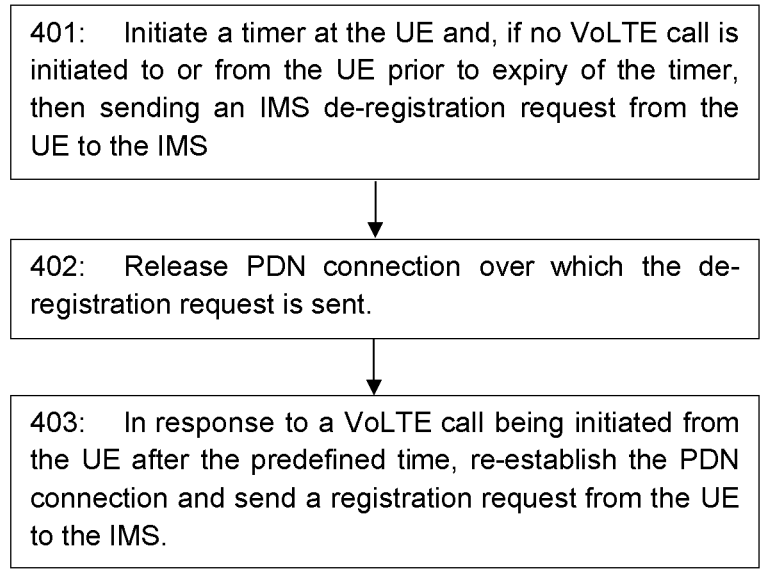
FIG. 4 is a flow diagram illustrating a method according to an embodiment of the present invention.

FIG. 4 is a flow diagram illustrating a method carried out by a UE. In step 401, following termination of a VoLTE, call, if no VoLTE call is initiated to or from the UE within a predefined time, a de-registration request is sent from the UE to the IMS. The PDN connection over which the de-registration request is sent is subsequently released (step 402). In step 403, in response to a VoLTE call being initiated from the UE after the predefined time, the PDN connection is re-established and a registration request is sent from the UE to the IMS.

Figure 5:
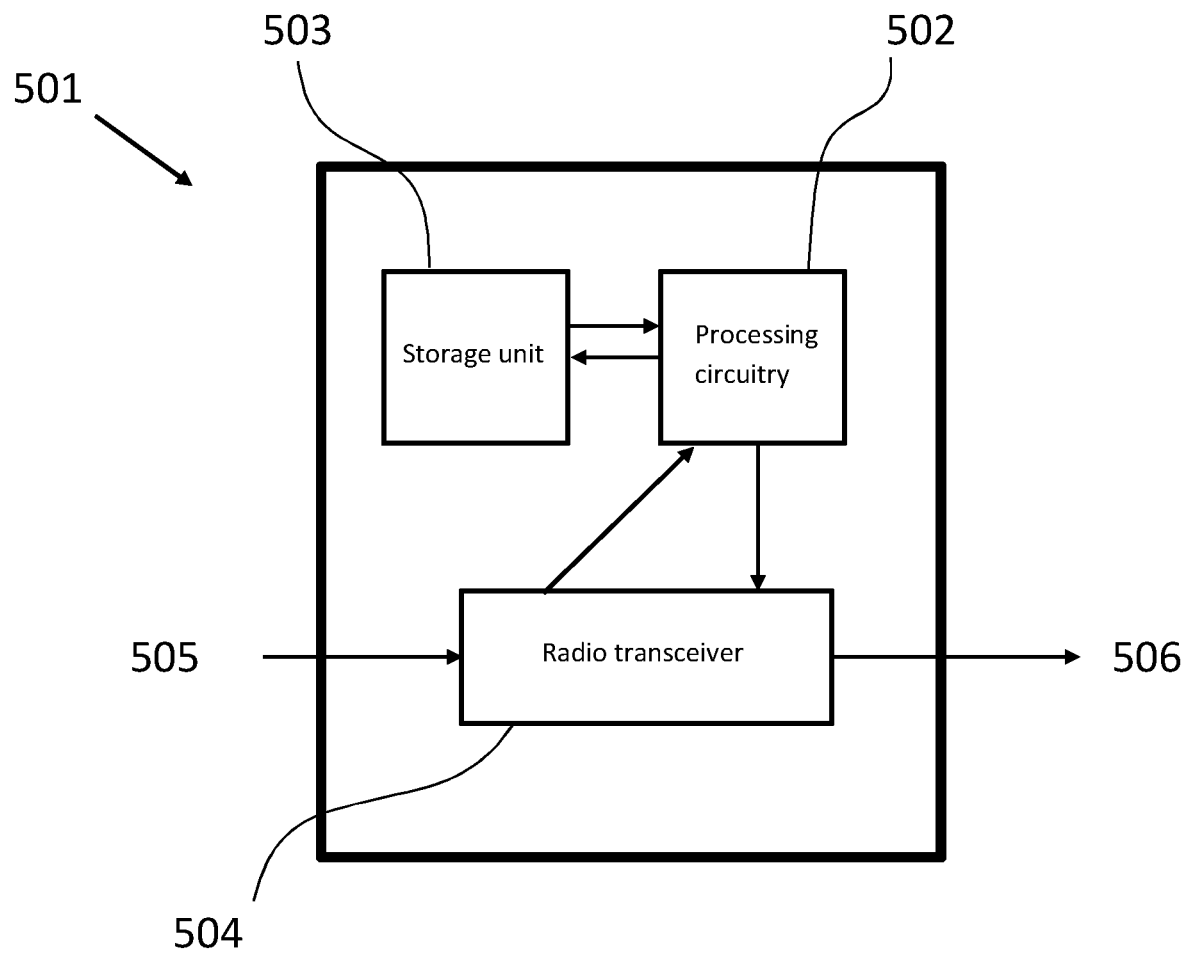
FIG. 5 is a schematic diagram of an apparatus according to an embodiment of the present invention.

FIG. 5 is a schematic diagram of an exemplary apparatus 501 for carrying out the above-described methods. The apparatus 501 comprises: processor circuitry 502; a storage unit 503 storing instructions executable by the processor circuitry 502, and a radio transceiver 504 for receiving messages 505 and transmitting messages 506.

The invention claimed is:

1. A method of managing registration of a User Equipment (UE) with an IP Multimedia Subsystem (IMS) via a Long-Term Evolution (LTE) network, the method comprising:
   initiating, at the UE, a timer having a predefined time, following termination of a Voice over LTE (VoLTE) call;
   sending, by the UE, an IMS de-registration request from the UE to the IMS at expiry of the timer to de-register the UE from the IMS, when no further VoLTE call is initiated to or from the UE prior to the expiry of the timer; and
   when further VoLTE call is initiated to or from the UE prior to the expiry of the timer, using existing registration and connection to the IMS for the further VoLTE call and re-starting the timer following termination of the further VoLTE call.

2. The method according to claim 1 further comprising, in response to a request to initiate a VoLTE call at the UE after the predefined time, sending a registration request from the UE to the IMS to perform IMS registration and initiating the VoLTE call.

3. The method according to claim 1 further comprising releasing a Packet Data Network (PDN) connection over which the de-registration request was sent in response to the sending the de-registration request.

4. The method according to claim 3 further comprising, in response to a request at the UE to initiate a VoLTE call after the predefined time, re-establishing the PDN connection and sending an IMS registration request from the UE to the IMS over that PDN connection.

5. The method according to claim 1 further comprising sending diagnostic or measurement data from the UE to a remote server using a Packet Data Network (PDN) connection over which the de-registration request was sent.

6. The method according to claim 1 further comprising receiving, at the UE, via a Packet Data Network (PDN) connection over which the de-registration request was sent, a command for the UE to register with the IMS.

7. The method according to claim 1, wherein the timer has a value less than 1 hour, less than 10 minutes, or less than 1 minute.

8. An apparatus configured to operate as a User Equipment (UE) for a Long-Term Evolution (LTE) network, the apparatus comprising:
   processor circuitry; and
   a storage unit storing instructions which, when executed by the processor circuitry cause the apparatus to:
      initiate, by the UE, a timer having a predefined time, following termination of a Voice over LTE (VoLTE) call;
      send, by the UE, an IP Multimedia Subsystem (IMS) de-registration request from the UE to the IMS at expiry of the timer to de-register the UE from the IMS, when no further VoLTE call is initiated to or from the UE prior to the expiry of the timer; and
      when further VoLTE call is initiated to or from the UE prior to the expiry of the timer, use existing registration and connection to the IMS for the further VoLTE call and re-start the timer following termination of the further VoLTE call.

9. The apparatus according to claim 8, wherein the processor circuitry comprises a 4G CAT-M1 cellular modem chipset.

10. The apparatus according to claim 8, wherein the apparatus is configured to allow the timer value to be configured remotely.

11. The apparatus according to claim 8 further comprising a user interface for receiving a user request to initiate a VoLTE call.

* * * * *

UNITED STATES PATENT AND TRADEMARK OFFICE
CERTIFICATE OF CORRECTION

| | |
|---|---|
| PATENT NO. | : 11,368,933 B2 |
| APPLICATION NO. | : 16/957083 |
| DATED | : June 21, 2022 |
| INVENTOR(S) | : Stille et al. |

It is certified that error appears in the above-identified patent and that said Letters Patent is hereby corrected as shown below:

In the Claims

In Column 5, Line 40, delete "processor circuitry 502;" and insert -- processing circuitry 502; --, therefor.

In Column 5, Lines 41-42, delete "processor circuitry 502," and insert -- processing circuitry 502, --, therefor.

Signed and Sealed this
Eighteenth Day of October, 2022

*Katherine Kelly Vidal*

Katherine Kelly Vidal
*Director of the United States Patent and Trademark Office*